US012668197B2

(12) United States Patent
Priya et al.

(10) Patent No.: US 12,668,197 B2
(45) Date of Patent: Jun. 30, 2026

(54) VEHICULAR CABIN MONITORING SYSTEM

(71) Applicant: Magna Electronics Inc., Auburn Hills, MI (US)

(72) Inventors: Shrestha Priya, Bihar (IN); Krishnanand Hindoddi, Karnataka (IN); Veeranagouda Salmani, Karnataka (IN)

(73) Assignee: Magna Eletronics Inc., Auburn Hills, MI (US)

( * ) Notice: Subject to any disclaimer, the term of this patent is extended or adjusted under 35 U.S.C. 154(b) by 142 days.

(21) Appl. No.: 18/650,235

(22) Filed: Apr. 30, 2024

(65) Prior Publication Data

US 2024/0367595 A1     Nov. 7, 2024

Related U.S. Application Data

(60) Provisional application No. 63/499,520, filed on May 2, 2023.

(51) Int. Cl.
*B60R 11/04* (2006.01)
*B60R 1/12* (2006.01)
(52) U.S. Cl.
CPC ....... *B60R 11/04* (2013.01); *B60R 2001/1223* (2013.01)
(58) Field of Classification Search
CPC .......... G07C 5/0808; G07C 5/00; G07C 5/08; G07C 5/008; B60N 2/0272; B60N 2/02246; B60N 2/0276; B60N 2/2863; B60C 19/00; B60C 11/24; B60C 11/246; B60C 23/0449; B60R 21/20; B60R 21/213; B60R 21/232; B60R 21/233;

B60R 21/235; B60R 21/30; B60R 2021/0004; B60R 2021/23107; B60R 2021/23153; B60R 2021/23161; B60R 21/00; B60R 21/02; B60R 21/16; B60R 21/23; B60R 21/231; B60R 2021/23169; B60R 2021/23519;

(Continued)

(56) References Cited

U.S. PATENT DOCUMENTS 6,783,167 B2     8/2004   Bingle et al.
7,253,723 B2     8/2007   Lindahl et al.
(Continued)

FOREIGN PATENT DOCUMENTS

CN          113092877 A   *  7/2021   .........  G01R 29/0885

*Primary Examiner* — Brian A Zimmerman
*Assistant Examiner* — Anthony D Afrifa-Kyei
(74) *Attorney, Agent, or Firm* — HONIGMAN LLP

(57) ABSTRACT

A vehicular cabin monitoring system includes a radiation sensing device disposed at an interior portion of an interior cabin of a vehicle and capturing sensor data representative of electromagnetic radiation present at the radiation sensing device. An electronic control unit (ECU) includes a data processor operable to process sensor data captured by the radiation sensing device. The vehicular cabin monitoring system, based on processing at the ECU of sensor data captured by the radiation sensing device, determines an electromagnetic radiation level within the interior cabin of the vehicle. The vehicular cabin monitoring system, based on the determined electromagnetic radiation level within the interior cabin of the vehicle being greater than a threshold electromagnetic radiation level, generates an alert to a driver of the vehicle.

26 Claims, 1 Drawing Sheet

(58) Field of Classification Search

CPC ........... B60R 2021/23523; B60R 2021/23557; B60R 2021/2358; B60R 2021/2359; B60R 25/31; B60R 25/00; B60R 25/30; B60R 16/023; B60R 25/01; B60R 25/102; B60R 25/24; B60R 25/305; B60R 1/29; B60R 1/30; B60R 11/04; B60R 2001/1223; G02B 27/01; G02B 2027/014; G02B 2027/0187; G02B 27/00; G02B 27/0101; G06F 18/2411; G06K 7/10178; G06V 10/143; G06V 20/59; G06V 20/593; G06V 30/194; G06V 10/754; G06V 20/52; G06V 20/58; G06V 10/80; G06V 10/803; G06V 40/10; B60H 1/00792; A61B 5/0022; A61B 5/02444; A61B 5/02405; A61B 5/0507; A61B 5/0816; A61B 5/1116; A61B 5/165; A61B 5/6893; A61B 5/747; A61B 2560/0209; G01S 13/04; G01S 13/288; G01S 13/42; G01S 13/44; G01S 13/56; G01S 13/581; G01S 13/753; G01S 13/89; G01S 15/89; G01S 17/931; G01S 7/412; G01S 7/415; G01S 7/497; G01S 7/417; G01S 7/539; G16H 30/20; G16H 30/40; G16H 40/20; G16H 40/63; G16H 40/67; G16H 50/20; G16H 50/30; G16H 50/70; G16H 50/00; H04N 23/45; H04N 23/00; H04N 23/13; H04N 7/18; H04N 23/11; H04N 23/61; H04N 23/611; H04N 23/80; H04N 23/90; H04N 7/185; G01J 5/0025; G01J 2005/0077

See application file for complete search history.

(56) References Cited

U.S. PATENT DOCUMENTS

| | | | |
|---|---|---|---|
| 7,914,187 | B2 | 3/2011 | Higgins-Luthman et al. |
| 9,405,120 | B2 | 8/2016 | Graf et al. |
| 9,499,139 | B2 | 11/2016 | Koravadi |
| 10,017,114 | B2 | 7/2018 | Bongwald |
| 10,065,574 | B2 | 9/2018 | Tiryaki |
| 10,958,830 | B2 | 3/2021 | Koravadi |
| 11,518,401 | B2 | 12/2022 | Kulkarni |
| 11,582,425 | B2 | 2/2023 | Liu |
| 11,639,134 | B1 | 5/2023 | Huizen et al. |
| 11,780,372 | B2 | 10/2023 | Sobecki et al. |
| 11,827,153 | B2 | 11/2023 | Miller et al. |
| 2006/0115117 | A1* | 6/2006 | Nagaoka ................. G06V 20/58 382/104 |
| 2010/0045797 | A1* | 2/2010 | Schofield ............... G06V 20/58 348/148 |
| 2012/0268311 | A1* | 10/2012 | Lynam ................... G01S 7/4813 342/52 |
| 2014/0285666 | A1 | 9/2014 | O'Connell et al. |
| 2014/0336876 | A1 | 11/2014 | Gieseke et al. |
| 2015/0009010 | A1 | 1/2015 | Biemer |
| 2015/0015710 | A1 | 1/2015 | Tiryaki |
| 2015/0022664 | A1 | 1/2015 | Pflug et al. |
| 2015/0092042 | A1 | 4/2015 | Fursich |
| 2015/0232030 | A1 | 8/2015 | Bongwald |
| 2015/0294169 | A1 | 10/2015 | Zhou et al. |
| 2015/0296135 | A1 | 10/2015 | Wacquant et al. |
| 2015/0352953 | A1 | 12/2015 | Koravadi |
| 2016/0137126 | A1 | 5/2016 | Fursich et al. |
| 2016/0209647 | A1 | 7/2016 | Fursich |
| 2017/0217367 | A1 | 8/2017 | Pflug et al. |
| 2017/0274906 | A1 | 9/2017 | Hassan et al. |
| 2018/0134217 | A1 | 5/2018 | Peterson et al. |
| 2018/0222414 | A1 | 8/2018 | Ihlenburg et al. |
| 2018/0231976 | A1 | 8/2018 | Singh |
| 2019/0210615 | A1 | 7/2019 | Caron et al. |
| 2020/0039321 | A1* | 2/2020 | Sakai ................. B60H 1/00742 |
| 2020/0143560 | A1 | 5/2020 | Lu et al. |
| 2020/0184669 | A1* | 6/2020 | Stent .......................... G06T 7/70 |
| 2020/0202151 | A1 | 6/2020 | Wacquant |
| 2020/0320320 | A1 | 10/2020 | Lynam |
| 2021/0155167 | A1 | 5/2021 | Lynam et al. |
| 2021/0162926 | A1 | 6/2021 | Lu |
| 2021/0245662 | A1 | 8/2021 | Blank et al. |
| 2021/0291739 | A1 | 9/2021 | Kasarla et al. |
| 2021/0323473 | A1 | 10/2021 | Peterson et al. |
| 2022/0242438 | A1 | 8/2022 | Sobecki et al. |
| 2022/0254132 | A1 | 8/2022 | Rother |
| 2022/0377219 | A1 | 11/2022 | Conger et al. |
| 2024/0064274 | A1 | 2/2024 | Blank et al. |
| 2024/0168355 | A1 | 5/2024 | Baur |
| 2024/0182059 | A1* | 6/2024 | Hashimoto ........ G01C 21/3415 |
| 2024/0190456 | A1 | 6/2024 | P et al. |
| 2024/0383406 | A1 | 11/2024 | Sobecki |

\* cited by examiner

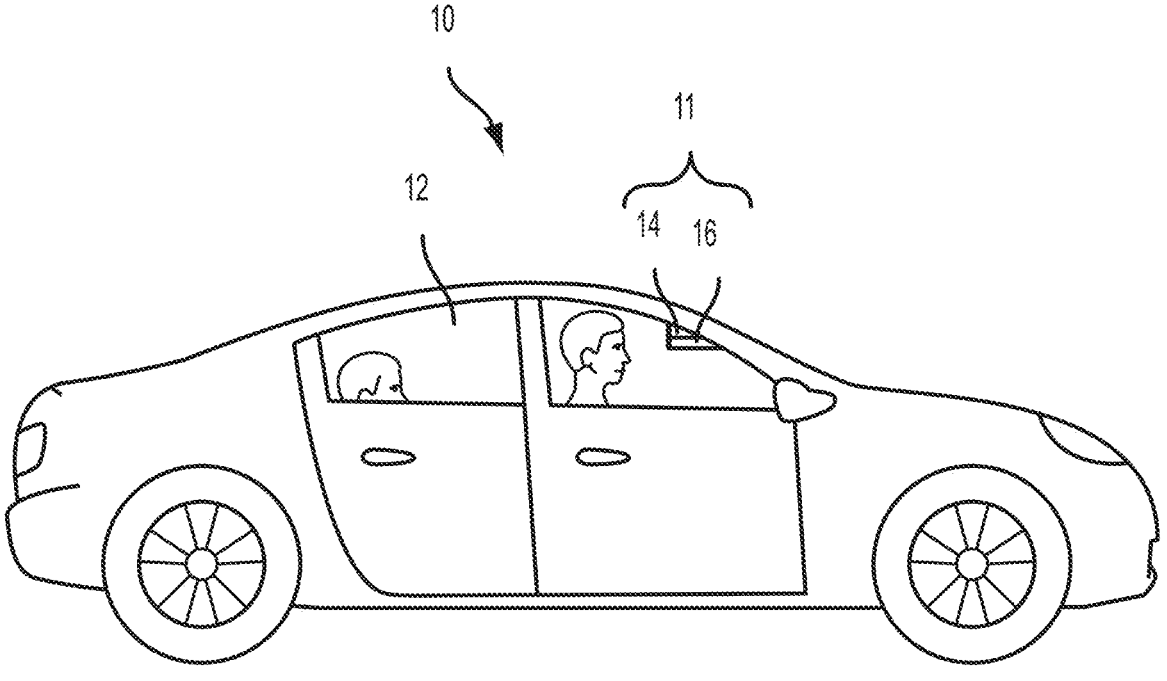

VEHICULAR CABIN MONITORING SYSTEM

CROSS REFERENCE TO RELATED APPLICATION

The present application claims the filing benefits of U.S. provisional application Ser. No. 63/499,520, filed May 2, 2023, which is hereby incorporated herein by reference in its entirety.

FIELD OF THE INVENTION

The present invention relates generally to a vehicular sensing system for a vehicle.

BACKGROUND OF THE INVENTION

It is known to provide an alert system at a vehicle that displays messages, illuminates icons, or plays audio tones to notify a driver of the vehicle or required vehicle maintenance or to prompt the driver to put on a seatbelt.

SUMMARY OF THE INVENTION

A vehicular cabin monitoring system includes a radiation sensing device disposed at an interior portion of a vehicle equipped with the cabin monitoring system. The radiation sensing device captures sensor data representative of a level of radiation present at the radiation sensing device. An electronic control unit (ECU) includes electronic circuitry and associated software. The electronic circuitry includes a data processor configured to process sensor data captured by the radiation sensing device. The vehicular cabin monitoring system, based on processing at the ECU of sensor data captured by the radiation sensing device, determines a radiation level at the interior portion of the vehicle. The vehicular cabin monitoring system, based on the determined radiation level at the interior portion of the vehicle being greater than a threshold radiation level, generates an alert to a driver of the vehicle.

These and other objects, advantages, purposes and features of the present invention will become apparent upon review of the following specification in conjunction with the drawings.

BRIEF DESCRIPTION OF THE DRAWINGS

FIG. 1 is a side view of a vehicle with a cabin monitoring system that incorporates a radiation sensing device.

DESCRIPTION OF THE PREFERRED EMBODIMENTS

A cabin monitoring system includes a radiation detector or sensing device disposed at an interior portion of a vehicle equipped with the cabin monitoring system. The cabin monitoring system is configured to detect levels of radiation present at the interior portion of the vehicle and to generate an alert or warning signal to the vehicle occupants when the detected level of radiation is above a threshold level of radiation. The radiation sensing device of the system is disposed at any suitable position within the interior portion or cabin of the vehicle for collecting sensor data to detect radiation that would pose a danger to vehicle occupants. An electronic control unit (ECU) includes electronic circuitry and associated software, including a data processor configured to process sensor data captured by the radiation sensing device. The system, based on processing at the ECU of captured sensor data, determines a radiation level at the interior portion of the vehicle (or at a particular portion of the interior cabin of the vehicle, such as at the driver seat or passenger seat), and determines whether to issue the alert based on the determined level of radiation.

Referring now to the drawings and the illustrative embodiments depicted therein, a vehicle 10 is equipped with the cabin monitoring system 11 that includes the radiation detector or sensor or sensing device 14 at the interior cabin or portion 12 of the vehicle 10 (FIG. 1). The system 11 includes the electronic control unit (ECU) 16 having electronic circuitry and associated software, with the electronic circuitry including a data processor or image processor that is operable to process data captured by the radiation sensing device 14, whereby the ECU may detect or determine presence of radiation at the interior portion 12 of the vehicle via processing of captured sensor data. The data transfer or signal communication from the sensor to the ECU may comprise any suitable data or communication link, such as a vehicle network bus or the like of the equipped vehicle.

Various levels and types of radiation may be present at the interior cabin 12 of the vehicle 10. For example, radiation may be emitted from various vehicle sensors used by the vehicle, such as radar sensors, lidar sensors, or infrared or near infrared light emitters, or radiation may be emitted by mobile devices or cellphones of vehicle occupants. While low levels of radiation in the vehicle 10 may be harmless, detecting elevated levels of radiation is beneficial to prevent health problems for vehicle occupants related to radiation exposure. To detect radiation within the vehicle cabin 12, the radiation sensing device 14 (or multiple devices capable of sensing different types of radiation) may be positioned at or near an expected source or sources of radiation. In the illustrated example, the radiation sensing device 14 is disposed at a windshield mounted electronics module so as to have a field of sensing that may include radiation passing through the windshield of the vehicle, or that may originate from other sensors (e.g., radar, lidar, infrared or near infrared light emitters, cameras, and the like) that are disposed within the windshield mounted electronics module. It should be understood that the radiation sensing device 14 may be disposed at any suitable position configured to detect radiation that may be harmful to vehicle occupants. For example, the radiation sensing device 14 may be attached to, mounted in, or integrated with the doors, headliner, interior rearview mirror, dashboard, gauge cluster, steering wheel, seatbelt, headrest, and/or seats of the vehicle 10.

The radiation sensing device 14 may comprise any suitable radiation detecting sensor, such as a gas-filled detector, a scintillator, or a solid state detector, and may be configured to detect a particular type of radiation expected to be present at the interior cabin of the vehicle, such as a specific wavelength or range of wavelengths.

When the system 11 determines the radiation level present at the interior cabin 12 of the vehicle 10, the system 11 generates an alert or signal to the driver and vehicle occupants when the determined level of radiation is above a threshold level. The threshold level may be predetermined, such as a known level of radiation that is dangerous or harmful to humans, or may be determined by the system 11. For example, the system 11 may determine an environmental or background level of radiation present at the interior cabin 12 of the vehicle 10 and issue the alert when the determined level of radiation is greater than the background level of radiation by a threshold amount, such as when the determined level is twice as much or three times as much or more than the background amount of radiation.

Optionally, the system 11 may adjust the threshold level based on the occupants present in the vehicle. For example, the vehicle 10 may be equipped with a driver monitoring and/or occupant monitoring system configured to determine presence of occupants within the vehicle 10. If the monitoring system determines presence of children within the vehicle 10, the threshold level of radiation may be lowered as compared to when only adults are determined within the vehicle 10. Similarly, the presence of animals (e.g., pets such as dogs and cats), or the presence of elderly people may result in a lowered threshold.

Furthermore, the threshold level may be adjusted based on a location of the vehicle 10, such as determined by a GPS positioning system of the vehicle 10. For example, different jurisdictions may have different regulations allowing for different exposure levels of radiation and the system 11 may adjust the threshold based on a current jurisdiction that the vehicle 10 is travelling in.

The alert may comprise any suitable signal or message displayed to the driver and/or occupants of the vehicle so that the occupants may avoid exposure to radiation. For example, the alert may include an audio tone or message, illumination of an icon (e.g., at the gauge cluster or interior mirror assembly), or a messaged displayed at a display screen or infotainment screen of the vehicle 10. The alert may include progressive signals, such as green, yellow, and red indicators for low, medium, and high detected levels of radiation.

Thus, the system 11 detects presence and determines levels of radiation present at the interior cabin 12 of the vehicle 10. When the determined level of radiation is above a threshold level, the system 11 generates an alert signal to the driver and/or vehicle occupants. The threshold level may be adjusted based on, for example, the determined occupants within the vehicle 10, or a background level of radiation calibrated by the system 11.

In other words, the system 11 detects the radiation levels inside the vehicle 10 and warn the driver and passengers if radiation exceeds an allowed range based on the occupant types. The system 11 continuously monitors the level of radiation inside the cabin 12 of the vehicle 10. Radiation inside the vehicle 10 may be generated due to various factors like usage of sensors like radars, sound velocity sensors (SVS), and an increased number of electronics in the vehicle 10. Radiation above a certain level can have an impact on the health of passengers, including children, adults, and elderly people, and animals (e.g., pets). People's health will be impacted in the long term if they are continuously exposed to radiation. This system 11 avoids the impact on people's health in the long term, whereas some health monitoring system monitors only the driver heart rate, which is related to the driver only. By providing the different level of warning based on the intensity of the radiation, the driver may take corrective action.

The radiation level monitoring may provide the warning to the user to take necessary action to avoid damage to the driver and passengers. Activation of this feature may be manual or automatic, where the feature detects and warns automatically. The different levels may include green, yellow, and red zones. The user may manually switch the feature on and off. The monitoring and warning levels can be handled in software based on regulations of different territories.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels or at least two million photosensor elements or pixels or at least three million photosensor elements or pixels or at least five million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The system may utilize aspects of driver monitoring systems and/or head and face direction and position tracking systems and/or eye tracking systems and/or gesture recognition systems. Such head and face direction and/or position tracking systems and/or eye tracking systems and/or gesture recognition systems may utilize aspects of the systems described in U.S. Pat. Nos. 11,582,425; 11,518,401; 10,958, 830; 10,065,574; 10,017,114; 9,405,120 and/or 7,914,187, and/or U.S. Publication Nos. US-2022-0377219; US-2022-0254132; US-2022-0242438; US-2021-0323473; US-2021-0291739; US-2020-0202151; US-2020-0143560; US-2020-0320320; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or U.S. patent application Ser. No. 18/508,351, filed Nov. 14, 2023, now U.S. Pat. No. 12,393, 089, and/or U.S. patent application Ser. No. 18/535, 183, filed Dec. 11, 2023, now U.S. Pat. No. 12,403,931, and/or International Publication Nos. WO 2023/220222; WO 2023/034956; WO 2022/241423 and/or WO 2022/187805, which are all hereby incorporated herein by reference in their entireties.

Optionally, the driver monitoring system may be integrated with a camera monitoring system (CMS) of the vehicle. The integrated vehicle system incorporates multiple inputs, such as from the inward viewing or driver monitoring camera and from the forward or outward viewing camera, as well as from a rearward viewing camera and sideward viewing cameras of the CMS, to provide the driver with unique collision mitigation capabilities based on full vehicle environment and driver awareness state. The image processing and detections and determinations are performed locally within the interior rearview mirror assembly and/or the overhead console region, depending on available space and electrical connections for the particular vehicle application. The CMS cameras and system may utilize aspects of the systems described in U.S. Publication Nos. US-2021-0245662; US-2021-0162926; US-2021-0155167; US-2018-0134217 and/or US-2014-0285666, and/or International Publication No. WO 2022/150826, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular cabin monitoring system, the vehicular cabin monitoring system comprising:

a radiation sensing device disposed at an interior portion of an interior cabin of a vehicle equipped with the vehicular cabin monitoring system, wherein the radiation sensing device is operable to capture sensor data representative of electromagnetic radiation present at the radiation sensing device;

an electronic control unit (ECU);

wherein sensor data captured by the radiation sensing device is transferred to the ECU;

wherein the ECU comprises electronic circuitry and associated software, and wherein the electronic circuitry of the ECU comprises a data processor operable to process sensor data captured by the radiation sensing device;

wherein the vehicular cabin monitoring system, based on processing at the ECU of sensor data captured by the radiation sensing device, determines an electromagnetic radiation level within the interior cabin of the vehicle;

wherein the vehicular cabin monitoring system, based on the determined electromagnetic radiation level within the interior cabin of the vehicle being greater than a threshold electromagnetic radiation level, generates an alert to a driver of the vehicle; and wherein the vehicular cabin monitoring system, based on processing at the ECU of sensor data captured by the radiation sensing device, determines a baseline electromagnetic radiation level within the interior cabin of the vehicle, and wherein the threshold electromagnetic radiation level comprises a multiple of the determined baseline electromagnetic radiation level.

2. The vehicular cabin monitoring system of claim 1, wherein the vehicular cabin monitoring system adjusts the threshold electromagnetic radiation level.

3. The vehicular cabin monitoring system of claim 2, wherein the threshold electromagnetic radiation level is adjusted based on a geographical location of the vehicle.

4. The vehicular cabin monitoring system of claim 2, wherein the threshold electromagnetic radiation level is adjusted based on determination of an age categorization of an occupant present in the vehicle that is one selected from the group consisting of (i) a child, (ii) a pet animal and (iii) an elderly person.

5. The vehicular cabin monitoring system of claim 4, wherein determination of the age categorization of the occupant present in the vehicle is performed by an occupant monitoring system of the vehicle.

6. The vehicular cabin monitoring system of claim 1, wherein the generated alert comprises a progressive alert, and wherein a level of the progressive alert is adjusted based on the determined electromagnetic radiation level.

7. The vehicular cabin monitoring system of claim 1, wherein the generated alert comprises a message displayed at a display device of the vehicle.

8. The vehicular cabin monitoring system of claim 1, wherein the generated alert comprises an audio tone played within the interior cabin of the vehicle.

9. The vehicular cabin monitoring system of claim 1, wherein the radiation sensing device is accommodated within an overhead console module of the vehicle.

10. The vehicular cabin monitoring system of claim 1, wherein the radiation sensing device is accommodated within an interior rearview mirror assembly of the vehicle.

11. The vehicular cabin monitoring system of claim 1, wherein the determined electromagnetic radiation level is a level of infrared radiation within the interior cabin of the vehicle.

12. The vehicular cabin monitoring system of claim 1, wherein the determined electromagnetic radiation level is a level of electromagnetic radiation emitted by a radar sensor within the interior cabin of the vehicle.

13. The vehicular cabin monitoring system of claim 1, wherein the vehicular cabin monitoring system is operable to determine radiation emitted by a mobile device within the interior cabin of the vehicle, and wherein the vehicular cabin monitoring system, based on the determined radiation emitted by the mobile device being greater than a threshold radiation level, generates the alert to the driver of the vehicle.

14. A vehicular cabin monitoring system, the vehicular cabin monitoring system comprising:

a radiation sensing device disposed at an interior portion of an interior cabin of a vehicle equipped with the vehicular cabin monitoring system, wherein the radiation sensing device is operable to capture sensor data representative of electromagnetic radiation present at the radiation sensing device;

wherein the radiation sensing device is accommodated within an interior rearview mirror assembly of the vehicle;

an electronic control unit (ECU);

wherein sensor data captured by the radiation sensing device is transferred to the ECU;

wherein the ECU comprises electronic circuitry and associated software, and wherein the electronic circuitry of the ECU comprises a data processor operable to process sensor data captured by the radiation sensing device;

wherein the vehicular cabin monitoring system, based on processing at the ECU of sensor data captured by the radiation sensing device, determines an electromagnetic radiation level within the interior cabin of the vehicle;

wherein the vehicular cabin monitoring system, based on the determined electromagnetic radiation level within the interior cabin of the vehicle being greater than a threshold electromagnetic radiation level, generates an alert to a driver of the vehicle; and wherein the vehicular cabin monitoring system adjusts the threshold electromagnetic radiation level based on a geographical location of the vehicle.

15. The vehicular cabin monitoring system of claim 14, wherein the generated alert comprises a progressive alert, and wherein a level of the progressive alert is adjusted based on the determined electromagnetic radiation level.

16. The vehicular cabin monitoring system of claim 14, wherein the vehicular cabin monitoring system, based on processing at the ECU of sensor data captured by the radiation sensing device, determines a baseline electromagnetic radiation level within the interior cabin of the vehicle, and wherein the threshold electromagnetic radiation level comprises a multiple of the determined baseline electromagnetic radiation level.

17. The vehicular cabin monitoring system of claim 14, wherein the determined electromagnetic radiation level is a level of infrared radiation within the interior cabin of the vehicle.

18. The vehicular cabin monitoring system of claim 14, wherein the determined electromagnetic radiation level is a level of electromagnetic radiation emitted by a radar sensor within the interior cabin of the vehicle.

19. The vehicular cabin monitoring system of claim 14, wherein the vehicular cabin monitoring system is operable to determine radiation emitted by a mobile device within the interior cabin of the vehicle, and wherein the vehicular cabin monitoring system, based on the determined radiation emitted by the mobile device being greater than a threshold radiation level, generates the alert to the driver of the vehicle.

20. A vehicular cabin monitoring system, the vehicular cabin monitoring system comprising:

a radiation sensing device disposed at an interior portion of an interior cabin of a vehicle equipped with the vehicular cabin monitoring system, wherein the radiation sensing device is operable to capture sensor data representative of electromagnetic radiation present at the radiation sensing device;

an electronic control unit (ECU);

wherein sensor data captured by the radiation sensing device is transferred to the ECU;

wherein the ECU comprises electronic circuitry and associated software, and wherein the electronic circuitry of the ECU comprises a data processor operable to process sensor data captured by the radiation sensing device;

wherein the vehicular cabin monitoring system, based on processing at the ECU of sensor data captured by the radiation sensing device, determines an electromagnetic radiation level within the interior cabin of the vehicle;

wherein the vehicular cabin monitoring system, based on the determined electromagnetic radiation level within the interior cabin of the vehicle being greater than a threshold electromagnetic radiation level, generates an alert to a driver of the vehicle;

wherein the threshold electromagnetic radiation level is adjusted based on determination of an age categorization of an occupant present in the vehicle; and wherein the generated alert comprises a progressive alert, and wherein a level of the progressive alert is adjusted based on the determined electromagnetic radiation level.

21. The vehicular cabin monitoring system of claim 20, wherein the age categorization of the occupant present in the vehicle is one selected from the group consisting of (i) a child, (ii) a pet animal and (iii) an elderly person.

22. The vehicular cabin monitoring system of claim 21, wherein determination of the age categorization of the occupant present in the vehicle is performed by an occupant monitoring system of the vehicle.

23. The vehicular cabin monitoring system of claim 20, wherein the radiation sensing device is accommodated within one selected from the group consisting of (i) an overhead console module of the vehicle and (ii) an interior rearview mirror assembly of the vehicle.

24. The vehicular cabin monitoring system of claim 20, wherein the determined electromagnetic radiation level is a level of infrared radiation within the interior cabin of the vehicle.

25. The vehicular cabin monitoring system of claim 20, wherein the determined electromagnetic radiation level is a level of electromagnetic radiation emitted by a radar sensor within the interior cabin of the vehicle.

26. The vehicular cabin monitoring system of claim 20, wherein the vehicular cabin monitoring system is operable to determine radiation emitted by a mobile device within the interior cabin of the vehicle, and wherein the vehicular cabin monitoring system, based on the determined radiation emitted by the mobile device being greater than a threshold radiation level, generates the alert to the driver of the vehicle.

* * * * *